United States Patent
Stembridge

(10) Patent No.: US 6,464,303 B2
(45) Date of Patent: Oct. 15, 2002

(54) DECORATIVE SAFETY ATTACHMENT FOR TIRE RIMS

(76) Inventor: Ronnie Stembridge, 54 Levinson Ave., South River, NJ (US) 08882

( * ) Notice: Subject to any disclaimer, the term of this patent is extended or adjusted under 35 U.S.C. 154(b) by 0 days.

(21) Appl. No.: 09/799,870

(22) Filed: Mar. 6, 2001

(65) Prior Publication Data

US 2002/0125763 A1 Sep. 12, 2002

(51) Int. Cl.[7] ............................................. B60B 7/00
(52) U.S. Cl. ........................ 301/37.31; 301/37.101; 359/524
(58) Field of Search ........................ 301/37.101, 37.26, 301/37.108, 37.109, 37.31, 37.34, 37.35, 37.36; 40/587; 359/515, 524

(56) References Cited

U.S. PATENT DOCUMENTS

| | | | | |
|---|---|---|---|---|
| 1,814,054 A | * | 7/1931 | Munson | |
| 2,151,485 A | * | 3/1939 | Pawsat | |
| D164,030 S | * | 7/1951 | Lyon | D12/212 |
| D194,101 S | * | 11/1962 | Krispinsky | |
| 3,322,468 A | * | 5/1967 | Spisak | |
| 4,631,848 A | * | 12/1986 | Iwasa et al. | 40/587 X |
| 4,655,546 A | * | 4/1987 | Nagasaka et al. | 350/99 |
| D362,651 S | * | 9/1995 | Hsu | D12/204 |
| 5,840,405 A | * | 11/1998 | Shusta et al. | 428/156 |
| 5,931,543 A | * | 8/1999 | Smith | 301/37.101 |
| 5,969,863 A | * | 10/1999 | Staub et al. | 359/567 |
| 6,010,196 A | * | 1/2000 | Wang et al. | 301/37.34 |

* cited by examiner

*Primary Examiner*—Russell D. Stormer
(74) *Attorney, Agent, or Firm*—Goldstein & Lavas, P.C.

(57) ABSTRACT

A decorative safety attachment for tire rims including a circular plate dimensioned for positioning over the tire rim. The circular plate has a diameter consistent with a diameter of the tire rim. The circular plate has an inner surface, an outer surface, and a peripheral edge. The outer surface is coated with a reflective surface. The outer surface has a plurality of concentric annular grooves formed therein.

5 Claims, 2 Drawing Sheets

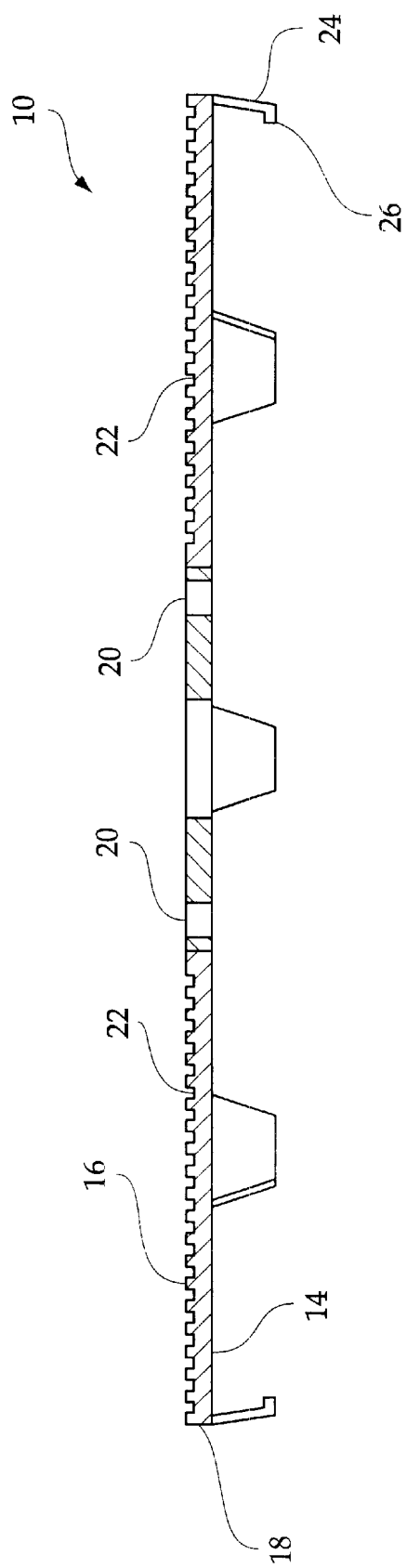

DECORATIVE SAFETY ATTACHMENT FOR TIRE RIMS

BACKGROUND OF THE INVENTION

The present invention relates to a decorative safety attachment for tire rims and more particularly pertains to attaching to a vehicle's tire rim to enhance visibility of the vehicle as well as enhance the appearance of the tire rim and vehicle.

The standard rims that support tires for automobiles are generally unpleasing to the eye. Some automobile owners will replace these rims with expensive decorative rims to increase the aesthetics of their automobile. Unfortunately, many automobile owners cannot afford these decorative rims and are forced to make do with the standard rims. Thus, the present invention will attempt to solve the abovementioned problem by providing an inexpensive alternative to expensive decorative rims that can be easily attached to the standard rims to provide enhance aesthetics.

Additionally, increasing the safety of automobiles is always a priority. Many accidents between vehicles occur because one driver was unable to see another vehicle. The present invention attempts to solve this problem by providing increased visibility to the tires so that other vehicle drivers will easily be able to notice them thereby avoiding a potential accident.

The use of wheel covers is known in the prior art. More specifically, wheel covers heretofore devised and utilized for the purpose of enhancing the appearance of wheels are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,636,906 to Chase discloses a chromium-plated composite wheel designed to provide a pleasing aesthetic effect to the wheel. U.S. Pat. No. 4,790,605 to Stalter, Sr. discloses a vehicle wheel with ornamental plastic overlay designed with a decorative contour exposed for viewing. U.S. Pat. No. 5,316,376 to Defreitas discloses a decorative wheel cover utilizing a mounted photograph or artwork.

While these devices fulfill their respective, particular objective and requirements, the aforementioned patents do not describe a decorative safety attachment for tire rims for attaching to a vehicle's tire rim to enhance visibility of the vehicle as well as enhance the appearance of the tire rim and vehicle.

In this respect, the decorative safety attachment for tire rims according to the present invention substantially departs from the conventional concepts and designs of the prior art, and in doing so provides an apparatus primarily developed for the purpose of attaching to a vehicle's tire rim to enhance visibility of the vehicle as well as enhance the appearance of the tire rim and vehicle.

Therefore, it can be appreciated that there exists a continuing need for a new and improved decorative safety attachment for tire rims which can be used for attaching to a vehicle's tire rim to enhance visibility of the vehicle as well as enhance the appearance of the tire rim and vehicle. In this regard, the present invention substantially fulfills this need.

SUMMARY OF THE INVENTION

In the view of the foregoing disadvantages inherent in the known types of wheel covers now present in the prior art, the present invention provides an improved decorative safety attachment for tire rims. As such, the general purpose of the present invention, which will be described subsequently in greater detail, is to provide a new and improved decorative safety attachment for tire rims which has all the advantages of the prior art and none of the disadvantages.

To attain this, the present invention essentially comprises a circular plate dimensioned for positioning over the tire rim. The circular plate has a diameter consistent with a diameter of the tire rim. The circular plate has an inner surface, an outer surface, and a peripheral edge. The circular plate has four central apertures therethrough. The central apertures are alignable with lug holes of the tire rim. The outer surface is coated with a reflective surface. The outer surface has a plurality of concentric annular grooves formed therein. The inner surface has a plurality of ribs extending inwardly therefrom in a spaced relationship adjacent to the peripheral edge. Each of the ribs has an inwardly turned free end. The plurality of ribs is engagable with an outer peripheral edge of the tire rim.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved decorative safety attachment for tire rims which has all the advantages of the prior art wheel covers and none of the disadvantages.

It is another object of the present invention to provide a new and improved decorative safety attachment for tire rims which may be easily and efficiently manufactured and marketed.

It is a further object of the present invention to provide a new and improved decorative safety attachment for tire rims which is of durable and reliable construction.

An even further object of the present invention is to provide a new and improved decorative safety attachment for tire rims which is susceptible of a low cost of manufacture with regard to both materials and labor, and which accordingly is then susceptible of low prices of sale to the consuming public, thereby making such a decorative safety attachment for tire rims economically available to the buying public.

Even still another object of the present invention is to provide a new and improved decorative safety attachment for tire rims for attaching to a vehicle's tire rim to enhance visibility of the vehicle as well as enhance the appearance of the tire rim and vehicle.

Lastly, it is an object of the present invention to provide a new and improved decorative safety attachment for tire rims including a circular plate dimensioned for positioning over the tire rim. The circular plate has a diameter consistent with a diameter of the tire rim. The circular plate has an inner surface, an outer surface, and a peripheral edge. The outer surface is coated with a reflective surface. The outer surface has a plurality of concentric annular grooves formed therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention as taken along line 3—3 of FIG. 2.

The same reference numerals refer to the same parts through the various figures.

DESCRIPTION OF THE PREFERRED EMBODIMENT

Figure 1:
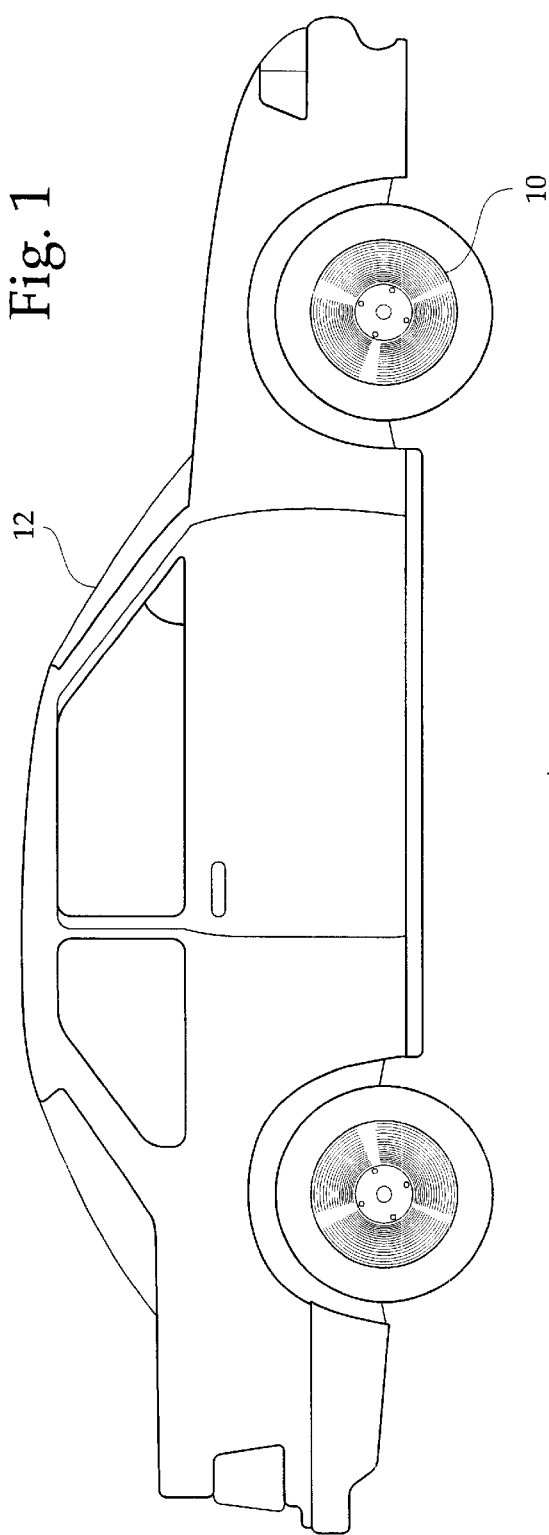
FIG. 1 is a side view of the present invention illustrated in p the tire rim's of a vehicle.
Figure 2:
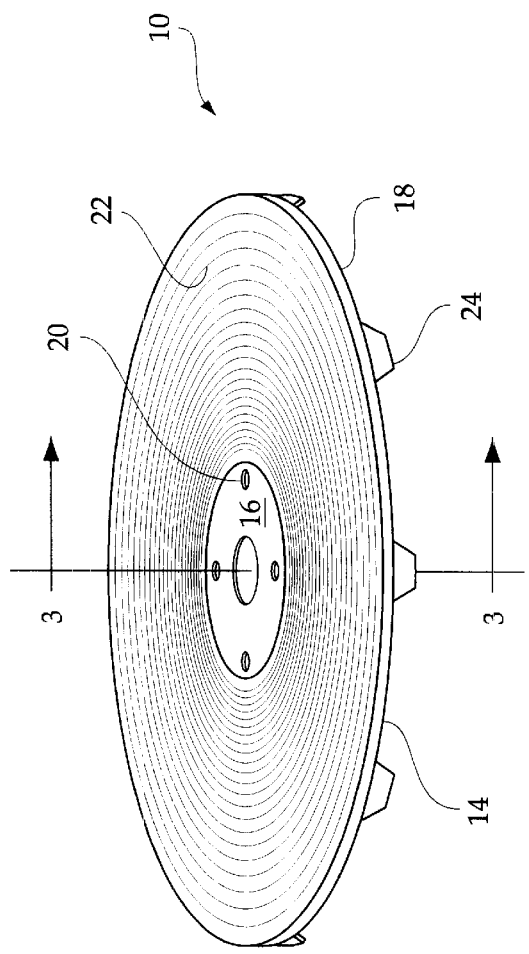
FIG. 2 is a perspective view of the preferred embodiment of the decorative safety attachment for tire rims constructed in accordance with the principles of the present invention.

With reference now to the drawings, and in particular, to FIGS. 1 through three thereof, the preferred embodiment of the new and improved decorative safety attachment for tire rims embodying the principles and concepts of the present invention and generally designated by the reference number 10 will be described.

Specifically, it will be: noted in the various Figures that the device relates to a decorative safety attachment for tire rims for attaching to a vehicle's tire rim to enhance visibility of the vehicle as well as enhance the appearance of the tire rim and vehicle.

"The present invention is essentially comprising a circular plate 10 that is used to cover the existing standard rim that tires for an automobile 12 are mounted on. The circular plate 10 is dimensioned for positioning over the tire rim. Note FIG. 1. The circular plate 10 has a diameter consistent with a diameter of the tire rim. The circular plate 10 has a substantially flat inner surface 14, a substantially flat outer surface 16, and a peripheral edge 18. The circular plate 10 has four central apertures 20 therethrough. The central apertures 20 are alignable with lug holes of the tire rim. Thus, the lugs from the tire rim can be removed and the circular plate 10 positioned against the tire rim whereupon the lugs can be replaced to secure the circular plate 10 in place. The outer surface is coated with a reflective surface.

A plurality of concentric annular grooves 22 extending into the outer surface 19. The inner surface 14 has a plurality of ribs 24 extending inwardly therefrom in a spaced relationship adjacent to the peripheral edge 18. Each of the rib's 24 has an inwardly turned free end 26. The plurality of ribs 24 are engagable with an outer peripheral edge of the tire rim. The ribs 24 can engage the outer peripheral edge of the tire rim to further engage the tire rim along with the lugs or can be used in lieu of the lugs."

The reflective surface along with the concentric grooves 22 have a twofold effect. First, during the daytime, the sun and light will shine on the circular plate 10 causing the reflective surface to give off a reflection known as the rainbow effect, similar to when light is shined on a compact disc. Second, at night, headlights and other sources of light will shine on the circular plate 10 causing the reflective surface to reflect the light thereby making the automobile more visible to prevent accidents.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A decorative safety attachment for tire rims for attaching to a vehicle's tire rim to enhance visibility of the vehicle as well as enhance the appearance of the tire rim and vehicle, the attachment comprising, in combination:

a circular plate dimensioned for positioning over the tire rim, the circular plate having a diameter consistent with a diameter of the tire rim, the circular plate having an inner surface, a substantially flat outer surface, and a peripheral edge, the circular plate having four central apertures therethrough, the central apertures being alignable with lug holes of the tire rim, the outer surface having a reflective surface, a plurality of concentric annular grooves extend into the outer surface the concentric annular grooves and reflective surface together forming a rainbow effect when light is shined upon the outer surface, the inner surface having a plurality of ribs extending inwardly therefrom in a spaced relationship adjacent to the peripheral edge, each of the ribs having an inwardly turned free end, the plurality of ribs being engagable with an outer peripheral edge of the tire rim.

2. A decorative safety attachment for tire rims for attaching to a vehicle's tire rim to enhance visibility of the vehicle as well as enhance the appearance of the tire rim and vehicle, the attachment comprising, in combination:

a circular plate dimensioned for positioning over the tire rim, the circular plate having a diameter consistent with a diameter of the tire rim, the circular plate having an inner surface, a substantially flat outer surface, and a peripheral edge, the outer surface having a reflective surface, a plurality of concentric annular grooves extend into the outer surface the concentric annular grooves and reflective surface together forming a rainbow effect when light is shined upon the outer surface.

3. The decorative safety attachment for tire rims as set forth in claim 2 wherein, the circular plate has four central apertures therethrough, the central apertures being alignable with lug holes of the tire rim.

4. The decorative safety attachment for tire rims as set forth in claim 2 wherein, the inner surface has a plurality of ribs extending inwardly therefrom in a spaced relationship adjacent to the peripheral edge, the plurality of ribs being engagable with an outer peripheral edge of the tire rim.

5. The decorative safety attachment for tire rims as set forth in claim 4 wherein, each of the ribs has an inwardly turned free end.

* * * * *